United States Patent [19]

Filer

[11] 3,955,290
[45] May 11, 1976

[54] LEARNING DEVICES

[76] Inventor: Armand Jay Filer, 2406 Addison Circle, Thousand Oaks, Calif. 91360

[22] Filed: June 5, 1975

[21] Appl. No.: 584,159

[52] U.S. Cl. .................................................. 35/9 C
[51] Int. Cl.² ............................................ G09B 7/10
[58] Field of Search .............................. 35/9 B, 9 C

[56] References Cited
UNITED STATES PATENTS

| | | | |
|---|---|---|---|
| 3,166,857 | 1/1965 | Wood | 35/9 B |
| 3,187,443 | 6/1965 | Schure et al. | 35/9 C |
| 3,327,405 | 6/1967 | Ingeneri | 35/9 B |
| 3,477,144 | 11/1969 | Stillit | 35/9 C |
| 3,575,545 | 4/1971 | Millar | 35/9 C |
| 3,579,864 | 5/1971 | Littwin | 35/9 C |
| 3,600,824 | 8/1971 | Robinson | 35/9 B |
| 3,626,608 | 12/1971 | Ingeneri | 35/9 B X |
| 3,634,950 | 1/1972 | McKay | 35/9 B X |
| 3,696,525 | 10/1972 | Cleary | 35/9 B |
| 3,720,006 | 3/1973 | Boram | 35/9 C |
| 3,736,671 | 6/1973 | Oleinick | 35/9 C |
| 3,809,784 | 5/1974 | Munafo | 35/9 B |

*Primary Examiner*—William H. Grieb
*Attorney, Agent, or Firm*—AA & K Enterprises

[57] ABSTRACT

An electronic matching circuit for use in teaching, having a plurality of contact pairs interconnected through an interchangeable and programmable matrix. One contact of each pair corresponds to a stimulus and the other contact of each pair to a response. A pair of decision probes are engaged with selected stimulus and selected response contacts. A momentary contact switch is depressed and one of two visual indicators is illuminated to display when a correct or incorrect response, respectively, has been chosen. Digital logic in conjunction with the decision probes determines which color indicator is energized.

7 Claims, 9 Drawing Figures

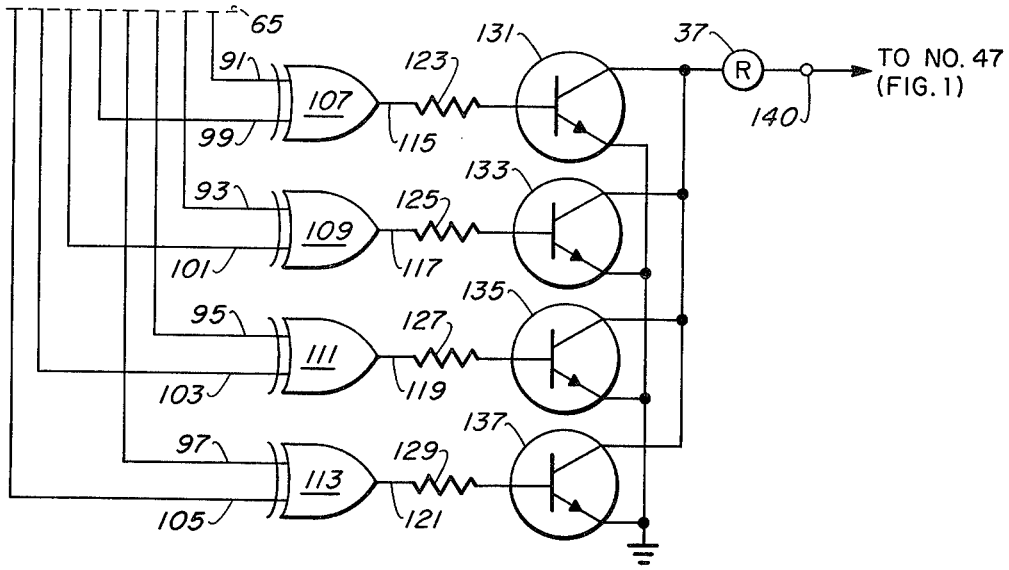
Fig. 2.
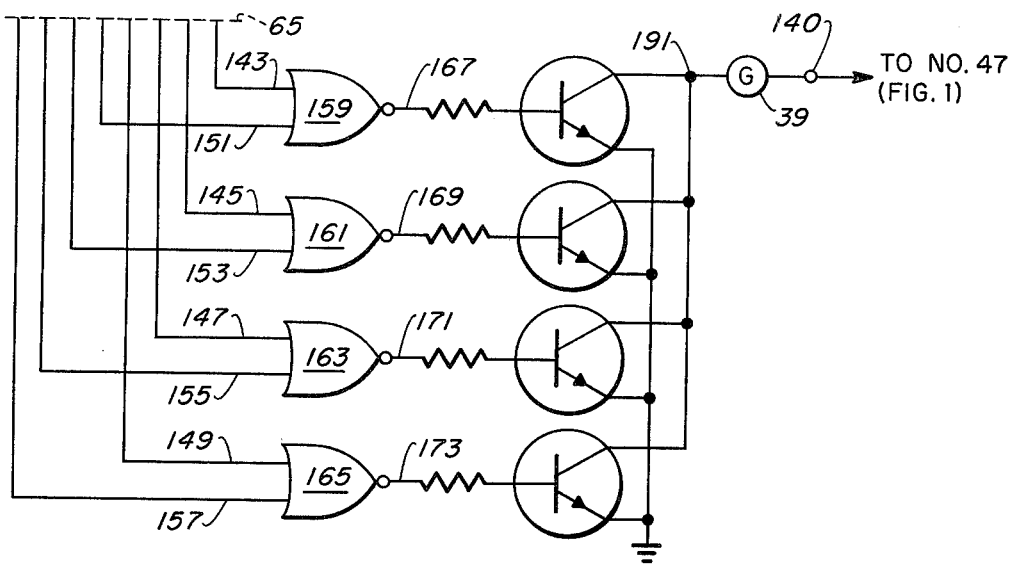
Fig. 3.
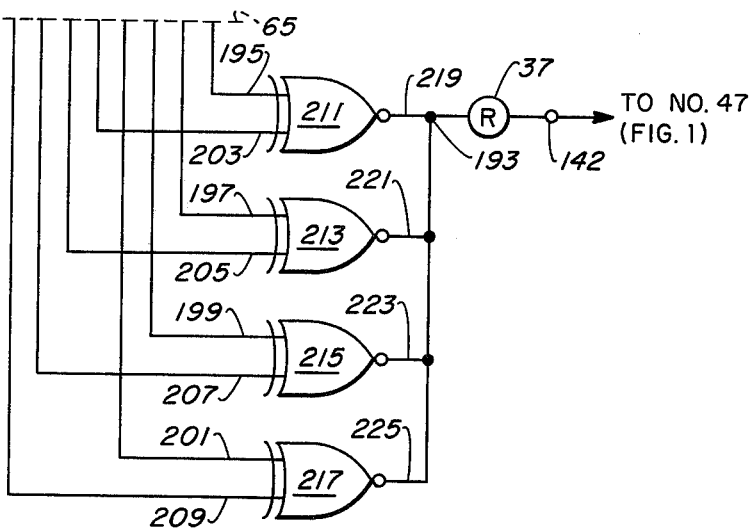
Fig. 4.
Fig. 4a.
| A | B | Y |
|---|---|---|
| 0 | 0 | 1 |
| 0 | 1 | 0 |
| 1 | 0 | 0 |
| 1 | 1 | 1 |

LEARNING DEVICES

FIELD OF THE INVENTION

This invention is associated with an educational learning device, and more explicitly, is concerned with a programmable electronic matching circuit for indicating correct and incorrect responses to multiple-choice stimuli in teaching situations.

DESCRIPTION OF THE PRIOR ART

Various learning devices are in existence wherein an individual can test his personal knowledge or understanding of widely different subjects using the concept of multiple-choice matching by manual selection.

However, the circuit design of many of these devices limits their commercial acceptance.

For example, a circuit which utilizes rotary switches to provide radially-oriented stimuluses and responses will be limited by the ability of the human eye to easily follow separate, closely-spaced radial lines between these stimuli and responses when the number of matches is large. In addition, in order to utilize the full 360° of switch contact positions, indicia card overlays must have openings for the switch knobs in order to provide card surface around the entire periphery of each switch axis.

This approach does not provide the best presentation of information for multiple-choice matching situations and is therefore a limiting factor, especially if the subject matter being matched consists of space-consuming phrases, symbols or illustrations.

Other circuits known only foster a bare minimum of combined motor skills development and visual perception growth when they are utilized in devices. User motivation is often minimal because of insufficient allowance for pupil participation or a scant number of stimulus-response combinations.

Known circuits within the field of this invention do not provide any user flexibility for instant switching to alternate power sources.

Some circuits have not been designed with user convenience in mind and do not allow for construction of the most logical arrangement of external appendages relative to the position of the operator.

Several of the circuits of known and patented electronic devices would present potential safety hazards if utilized in classroom situations without modification.

Circuits of various other known teaching apparatuses often utilize a multiplicity of electromechanical devices such as relays, toggle switches and/or a multiplicity of separate battery sources which are not in consonance with the present state-of-the-art advances in electronics. Many learning device circuits utilize a vast number of unnecessary discrete components such as indicating lamps, resistors, capacitors, diodes, and transistors — all the result of less-than-optimum electronic circuit designs.

Finally the circuits of many teaching devices known in the field of this invention would be either too impractical to produce or would make the finished device too heavy to be considered as portable.

SUMMARY OF THE INVENTION

The present invention is a circuit for acknowledging receipt of programmed correct and incorrect information matches in which a stimulus is selected by means of a flexible probe inserted into one of a plurality of receptacle contacts and a response is similarly selected by means of a second flexible probe inserted into one of a separate plurality of receptacle contacts.

When the probes have engaged the contacts, a momentary contact switch is closed and separate colored indicators display whether a correct or incorrect response, respectively, has been chosen. Each stimulus and response set of contacts is connected to a first and second input pair of a digital logic function for which the correct response output can only occur when both probes make electrical contact with inputs of the same logic function.

The first input of each digital logic function is series-connected through a programmable and interchangeable matrix to a separate receptacle contact. The matrix consists of a rigid panel having a plurality of parallel conductors on one side of the panel oriented perpendicular to a plurality of parallel conductors on the opposite side of the same panel. Contacts between conductors of the resulting grid are made through the board at selected intersections by through-connecting drilled holes to provide programming capability.

BRIEF DESCRIPTION OF THE DRAWINGS

For a complete understanding of the invention, reference should be made of the drawings which accompany the following wherein: FIG. 1a is a truth table illustrating the operation of a digital logic OR circuit; FIG. 1b is a truth table illustrating the operation of a digital logic EXCLUSIVE OR circuit; FIG. 1c is a truth table illustrating the operation of a digital logic NOR circuit; FIG. 1d is a truth table illustrating the operation of a logic inverter or NOT circuit; FIG. 2 is an alternative partial circuit arrangement; FIG. 3 is a second alternative partial circuit arrangement; FIG. 4 is a third alternative partial circuit arrangement and FIG. 4a is a truth table illustrating the operation of a digital logic EXCLUSIVE NOR circuit.

DESCRIPTION OF THE PREFERRED EMBODIMENT

Figure 1:
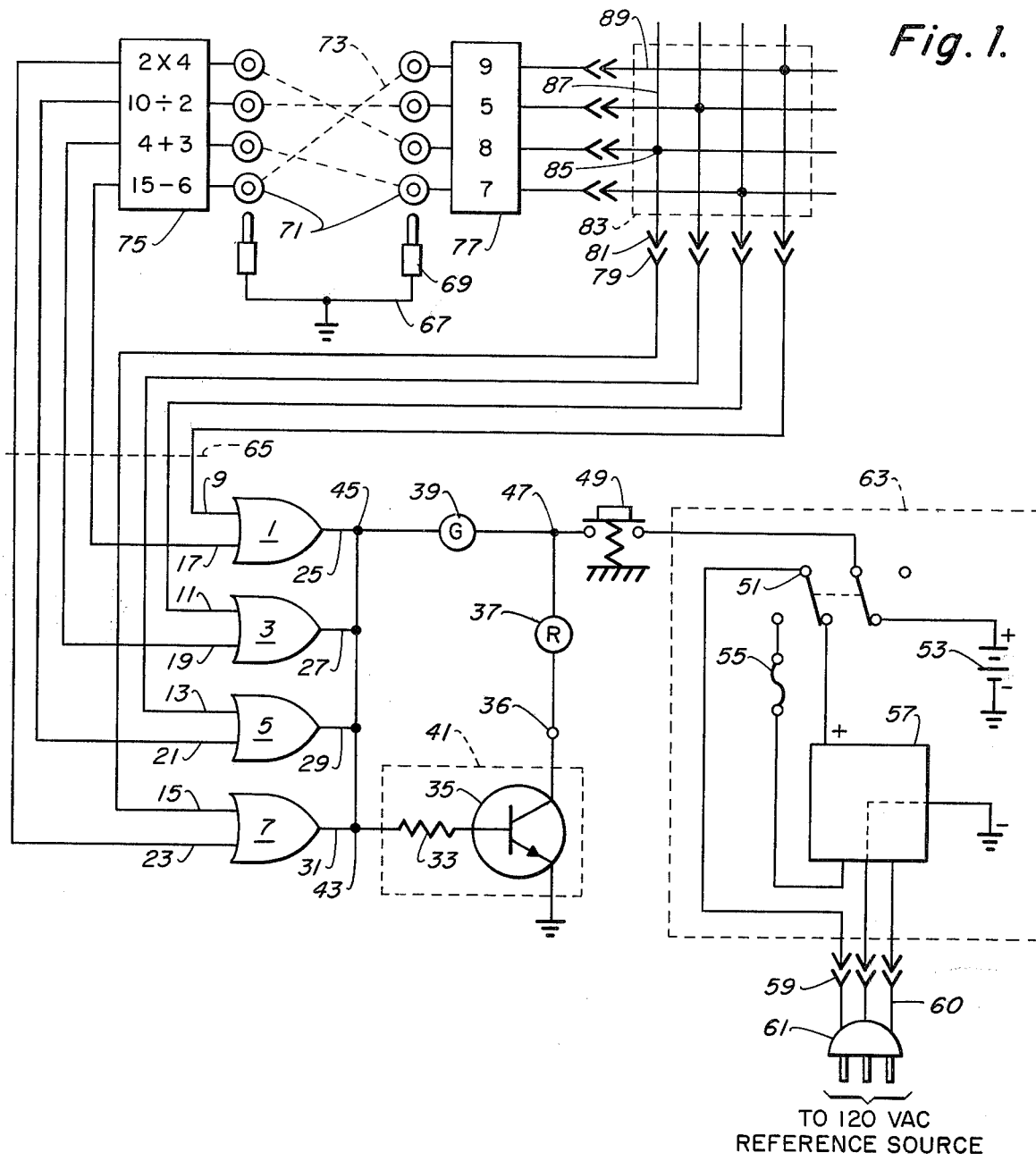
FIG. 1 is a circuit diagram of a preferred embodiment of the invention.

Referring now to FIG. 1, a multiplicity of digital logic OR functions 1, 3, 5 and 7 are connected with outputs 25, 27, 29 and 31 in parallel to both green indicator means 39 at node 45 and inverter means 41 at node 43. The inverter means 41 is comprised of resistor 33 and transistor 35. A red indicator means 37 is connected in series between the inverter 41 at juncture 36 and the green indicator means 39 at node 47. A momentary switch means 49 is connected in series between node 47 and a dual power source means 63. Dual power source means 63 is comprised of DC power means 53, AC-to-DC converter means 57, 3 conductor quick disconnect 59, detachable power cord 60, grounded male power connector 61, fuse means 55 and double-pole double-throw switch means 51.

First inputs 9, 11, 13 and 15 of digital logic OR functions 1, 3, 5 and 7 are series-connected respectively through quick disconnect receptacle contacts 79, thru mating quick-disconnect male contacts 81, through matrix means 83 to the right column of multiple receptacle contacts 71.

Second digital logic OR function inputs 17, 19, 21 and 23 are respectively connected to the left column of multiple receptacle contacts 71. Both first and second inputs pass through an arbitrary conductor interface line 65. Interface line 65 is the point where alternative circuit arrangements are interfaced when substitutions for the preferred embodiment are discussed. A bifurcated probe with a contact 69 fastened to the end of each branch is grounded through flexible conductors 67.

The matrix means 87 is comprised of a plurality of substantially horizontal grid means 89 and a plurality of substantially vertical grid means 87 with interconnections 85 at unique grid intercept locations. Coordinate locations of grid interconnections 85 are determined by programmed correct match paths 73 which, when traced to their source, encompass two separate conductor paths originating from the same logic function. Stimulus card 75 and corresponding response card 77 contain arbitrary subject matter that is equatable or related and thus is matchable through human thought processes. Both stimulus card 75 and response card 77 have the same width. They are sized to provide space for the typical subject matter used and their common length is dictated to by the number of pairs of contacts 71 and their associated vertical spacing. They thus assume a rectangular shape and are identical in material and size, retaining their individuality by virtue of their designated left and right positions. Each pair of these cards is color-coded identically to correspond with the color coding of matrix means 83. This insures that other uniquely-programmed, color-coded matrixes and their associated information cards can be interchanged as desired to minimize student memorization of correct match locations as opposed to really learning the subject matter presented.

Matrix means 83 is supported by a rigid panel which can be removed from or inserted into contacts 79 as desired. A handle is attached to the rigid support panel to provide hand positioning capability during engagement or disengagement with contacts 79.

Branch contacts 69 are manufactured with a right angle profile so that when the flexible conductor 67 is horizontal, branch contact 69 can be oriented vertically downward with the thumb and forefinger to conform with comfortable arm and hand movements when the circuitry described in this application is constructed and used on a plane surface. This arrangement corresponds to a typical situation where a person is using the circuitry described herein on the surface of a table while seated on a chair facing same. A match decision is accomplished by connection of the branch contacts 69 to an assumed pair of stimulus and response contacts 71. Either branch contact 69 may be connected to a stimulus contact or a response contact.

First inputs 9–15, 91–97, 143–149, and 195–201 of the respective OR, EXCLUSIVE OR, NOR and EXCLUSIVE NOR digital logic functions presented in FIGS. 1, 2, 3 and 4 are identified as A inputs in their respective truth tables of FIGS. 1a, 1b, 1c and 4a. Similarly, second inputs 17–23, 99–105, 151–157 and 203–209 of the same logic devices are identified respectively as B inputs as illustrated in the truth tables of FIGS. 1a, 1b, 1c and 4a. The A input of the truth table of FIG. 1d corresponds to inverter means 41 input designated as node 43 of FIG. 1. Numerals 25–31, 115–121, 167–173, 219–225, and juncture 36 designate respective OR, EXCLUSIVE OR, NOR, EXCLUSIVE NOR, and inverter function outputs and are identified respectively in FIGS. 1, 2, 3 and 4. These outputs correspond to truth table Y outputs of FIGS. 1a, 1b, 1c, 4a and 1d, respectively.

It will be appreciated by those skilled in the art that the complete circuit diagrams of FIGS. 1, 2, 3 and 4 include such suitable and necessary biasing voltage sources as are usually provided in such circuits. Such biasing is not illustrated in FIGS. 1, 2, 3 or 4.

It will also be appreciated that switch means 51 provides a choice of AC or DC power, and once the power means has been selected, it is made available upon demand to the remainder of the circuit by activation of momentary switch means 49. Although not illustrated in FIG. 1, switch means 51 is provided with a center OFF position.

In operation, a stimulus card 75 and a corresponding response card 77 comprising a selected set of matchable subject matter are positioned adjacent to contacts 71 as illustrated in FIG. 1. Assume a student desires to test the hypothesis that $2 \times 4 = 8$. A branch contact 69 is inserted into receptacle contact 71 corresponding to stimulus "$2 \times 4$". The remaining branch contact 69 is inserted into receptacle contact 71 corresponding to response "8". Referring now to matrix 83 it will be noted that the location of thru-connection 85 has been chosen (programmed) such that the match decision made will ground both the A and B inputs of OR function 7.

Now referring to the OR function truth table of FIG. 1a, it is apparent that this grounding is synonymous with a digital logic 0 on both the A and B inputs. The resulting Y output, also a digital logic 0, corresponds to OR function output 31, and effectively grounds inverter means 41 at node 43 and green indicator means 39 at node 45. When momentary switch means 49 is depressed, green indicator means 39 is illuminated through the ground path thus provided completing the circuit path through dual power source means 63. In this condition transistor 35 is biased off, and does not provide a circuit ground return for illumination of the red indicator means. Illumination of the green indicator means 39 signifies that the response chosen was correct and $2 \times 4 = 8$.

Assume next that any of the remaining incorrect choices illustrated on response card 77 had been chosen as a response for the $2 \times 4$ stimulus. Note that in each of these alternative situations, insertion of the second branch contact 69 into any receptacle contact 71 other than the correct one will only ground a single input from each of two separate OR functions. In FIG. 1a the resulting logic for inputs A and B in this case can only be 0,1 or conversely 1,0. It is seen that the OR function outputs under these circumstances will be a digital logic 1. Since the OR function outputs 1, 3, 5 and 7 are connected in parallel, the resulting logic 1 state also appears at modes 43 and 45. When momentary switch means 49 is depressed, transistor 35 is biased on through base-current limiting resistor 33. Red indicator means 37 illuminates using the ground return path thus established through transistor 35. Red illumination signifies the resulting incorrect response. Green indicator means 39 cannot illuminate in this case for lack of a circuit ground return path.

The final digital logic state illustrated in the truth table of FIG. 1a occurs if branch contacts 69 are not connected to receptacle contacts 71 and momentary switch means 49 is depressed. Since OR function inputs 9, 17, 11, 19, 13, 21, 15 and 23 would not be grounded and thus forced to the logic 0 state, the resulting OR function outputs 25, 27, 29 and 31 remain at logic 1, which also appears at nodes 43 and 45. This condition, as in the two previous cases when one input from each OR function is in the digital logic 0 state, results in illumination of the red indicating means 37.

Illumination of red indicator means 37 in this case may be thought of as signifying that power is available for matching purposes, but no match has been initiated.

Referring to FIG. 2, an alternative circuit arrangement for red illumination is shown.

Red indicator means 37 and inverter means 41 as shown in FIG. 1 are removed from the circuit. Reference point 140 of FIG. 2 is connected to node 47 and inputs 91, 99, 93, 101, 95, 103, 97 and 105 of EXCLUSIVE OR functions 107, 109, 111 and 113 are connected respectively in parallel with inputs 9, 17, 11, 19, 13, 21, 15 and 23 of OR functions 1, 3, 5 and 7, FIG. 1, at conductor interface line 65. EXCLUSIVE OR functions 107, 109, 111 and 113 operate in accordance with the truth table of FIG. 1b. Assume for example, a representative case where both A and B inputs of single EXCLUSIVE OR function 111 are grounded by a correct match decision; the output for that function 119 becomes a logic 0. No current will flow through resistor 127, transistor 135 is biased off, and red indicator means 37 does not illuminate. Simultaneously the green illuminating means 39 circuitry of FIG. 1 operates as previously described to display the fact that the response was correct. Given the same set of initial conditions for EXCLUSIVE OR functions 107, 109, and 113, the result will be the same since all inverter outputs are connected in parallel. One disadvantage associated with the use of this circuit is that a multiplicity of resistors 123, 125, 127, 129 and transistors 131, 133, 135, 137 are required, one for each EXCLUSIVE OR function used. A second disadvantage is the fact that two different kinds of logic functions are required to produce both correct and incorrect indications. A third disadvantage is that two conductors will be required for each A and B input. Although a moot point, a possible reason for using the circuit of FIG. 2 would be to achieve a logic 0 output from each EXCLUSIVE OR function 107–113 under the condition where momentary switch means 49 is depressed with neither branch contact 69 touching or inserted into receptacle contacts 71. The resulting logic 0 biases off transistors 131–137, thereby precluding illumination of red indicator means 37 under this condition.

One alternative circuit is a modified parallel combination of the circuit arrangement shown in FIG. 3 and the circuit arrangement of FIG. 2, discussed above. In this combination all components of FIG. 1 between conductor interface line 65 and node 47 are removed. Circuit arrangements FIGS. 2 and 3 are then parallel-connected between these two reference points to achieve the red and green illuminating capability. This circuit combination has the distinct disadvantage of requiring vast numbers of components to perform the same functions provided by the simple circuit of FIG. 1. The truth table for operation of NOR functions 159, 161, 163 and 165 is illustrated in FIG. 1c. It will be appreciated by comparison of truth tables FIGS. 1c and 1b that the circuits of FIGS. 2 and 3 complement each other such that red indicating means 37 and green indicating means 39 can illuminate alternately but never simultaneously.

Another alternative circuit for achieving red indicating means 37 is shown in FIG. 4. It is comprised of EXCLUSIVE NOR functions 211, 213, 215 and 217 with parallel-connected outputs 219–225 common to node 193, attached to red indicator means 37. This circuit can be used in conjunction with the green indicating circuit of FIG. 3 or it can be used in lieu of inverter means 41 and the red indicator means 37 illustrated in FIG. 1. Connections are made at reference point 142 and conductor interface line 65.

Still another alternative circuit arrangement is obtained by combining inverter means 41 and red indicator means 37 of FIG. 1 with the green indicating circuit shown in FIG. 3. In this case the inverter means 41 and the red indicator means 37 series circuit is connected in parallel across FIG. 3 green indicator means 39, between node 191 and reference point 140.

Yet another alternative circuit arrangement is achieved by connecting the circuit of FIG. 3 and the circuit of FIG. 4 in parallel to provide green and red illuminating circuits, respectively. The truth table logic for the EXCLUSIVE NOR functions of FIG. 4 is illustrated in FIG. 4a.

It will further be appreciated by those skilled in the art that other arrangements can be developed using various combinations of inverter means 41 and logic functions to produce truth tables identical to those of FIGS. 1a, 1b, 1c and 4a.

Typical of these is the logic family resulting when an inverting means is connected in series with one input or individually to each input of the AND, NAND, EXCLUSIVE OR, and EXCLUSIVE NOR digital logic functions. Utilizing this concept, NOT functions combine with the NAND function and produces the truth table of FIG. 1a to behave like an OR function; NOT functions combine with the AND function and produces the truth table of FIG. 1c to behave like a NOR function; NOT functions combine with an EXCLUSIVE OR function and produces the truth table of FIG. 1b to behave like an EXCLUSIVE OR function; a single NOT function combines with an EXCLUSIVE NOR function and produces the truth table of FIG. 1b to behave like an EXCLUSIVE OR function; a single NOT function combines with an EXCLUSIVE OR function and produces the truth table of FIG. 4a to behave like an EXCLUSIVE NOR function; and lastly, NOT functions combine with an EXCLUSIVE NOR function and produces the truth table of FIG. 4a, and behaves like an EXCLUSIVE NOR function.

It should also be appreciated by those skilled in the art that the number of digital logic functions, the number of inverters and the capacity of the matrix can be expanded or contracted as necessary to accommodate a smaller or larger number of separate matchable combinations.

I claim:

1. A Programmable Electronic Circuit for Acknowledging Receipt of Manually-Made Correct and Incorrect Information Matches, comprising:
   a. A bifurcated conductor for probing, having two flexible branches at one end of said conductor, said conductor being singular at the opposite end, said singular end connected to electrical ground, each of said flexible branches having a contact connected to its mobile end;
   b. A means for signaling having a plurality of inputs separated into an equal number of first and second inputs, each said first and second input having a receptacle contact, said first input receptacle contacts positioned adjacent to separate stimuli, each of said second input receptacle contacts positioned adjacent to separate responses, a plurality of outputs separated into an equal number of first and second outputs, a selected contact of each first and second input receptacle contacts of said signaling means separately receiving a digital logic 0 signal when electrical continuity is made with either branch contact of said flexible conductor, whereby separation of at least one of said selected input receptacle contacts from at least one of said flexible branch contacts causes a digital logic 1 signal to be received at said selected receptacle contact inputs, said received digital logic signals simultaneously appearing at respective first and second outputs of said sgnaling means;

c. A digital logic means having a plurality of input pairs, each of said pairs having a first and second input, said digital logic means having a plurality of singular outputs connected in parallel, first inputs of each pair of said digital logic means connected respectively to first outputs of said signaling means;

d. A means for selective programming of second outputs of said signaling means, connected in series between second inputs of said digital logic means and respective second outputs of said signaling means, so that said programming means is interchangeable, said programming means having a matrix with a plurality of spaced substantially horizontal conductors dielectrically separated from a plurality of spaced substantially vertical conductors, said substantially horizontal conductors respectively connected to second inputs of said digital logic means, said substantially vertical conductors respectively connected to second outputs of said signaling means, said substantially vertical and horizontal conductors of said matrix selectively interconnected so that said digital logic signals can be programmed for transmission from any second output of said signaling means to any second input of said digital logic means, whereas digital logic 0 signals initiated by electrical contact with contacts of said flexible branches can be transmitted from a selected first input and a selected second input of said signaling means to any input pair of said digital logic means;

e. A means for providing visual illumination for correct and incorrect matching of said stimuli to said responses, including an inverter means connected in series with an incorrect indicating means, a correct indicating means connected in parallel with said inverter means and said incorrect indicating means, said illuminating means connected in series with said parallel outputs of said digital logic means to receive said digital logic signals, illumination of said correct indicating means occuring only upon receipt of digital logic 0 signal from the output of said digital logic means, illumination of said incorrect indicating means occuring only upon a receipt of a digital logic 1 signal from the output of said digital logic means.

2. The circuit of claim 1 wherein said programming means includes a rigid panel to support said programming means, said panel including a handle intended for grasping by the hand to position it, said panel having color coding on each side.

3. The circuit of claim 1 wherein each of said contacts of said flexible branches has a right angle profile to facilitate insertion into said receptacle contacts while maintaining comfortable arm and hand positons.

4. The circuit of claim 2 further comprising a plurality of pairs of interchangeable stimulus and response cards, each of said card pairs respectively color coded to correspond with color coding of said panel, each of said cards having a rectangular shape.

5. A circuit as recited in claim 1, further including a dual power source means, said dual power source comprising;

a. A DC power means having a first and second output, said first output of said DC power means supplying a digital logic 1 voltage, said second output of said DC power means connected to electrical ground;

b. An AC to DC converter power means having a first, second and third input and first and second outputs, said first input connected to electrical ground, said second input connected to one side of a commercially available 120 VAC reference voltage source, said first output of said converter power means supplying a digital logic 1 voltage, said second output of said converter power means connected to electrical ground;

c. A switch means having a first pole and a second pole, said first pole of said switch means connected in series between said first output of said converter power means and first output of DC power means so that either said DC power means or said converter power means can be selectively switched to provide a digital logic 1 voltage output;

d. A fuse means electrically connected in a series circuit with the alternate side of said commercially available 120 VAC reference voltage source and said third input of said converter power means through said second pole of said switch means such that when said converter power means is selected by said switch means said fuse means becomes an integral part of the electrical circuit of said input side of said converter power means to protect it form damage in case of an electrical short.

6. The circuit of claim 5 further comprising a momentary switch means, said momentary switch means connected in series between said dual power source output and said illuminating means, said digital logic 1 voltage being transmitted to said illuminating means upon activation of said momentary switch means.

7. The circuit of claim 6 further comprising a 3 conductor quick disconnect connector electrically connected in series between said first, second and third inputs of said converter power means and said commercially available 120 VAC reference voltage source, said 120 VAC reference voltage source having one grounded conductor.

* * * * *